United States Patent Office 3,625,658
Patented Dec. 7, 1971

3,625,658
APPARATUS FOR THE POLYMERIZATION AND COPOLYMERIZATION OF OLEFINS INCLUDING A CLOSED CIRCUIT TUBULAR REACTOR AND SUPPORT DEVICE THEREFOR
Andre Closon, Brussels, Belgium, assignor to Solvay & Cie, Brussels, Belgium
Filed May 12, 1969, Ser. No. 823,765
Claims priority, application France, May 14, 1968, 152,123
Int. Cl. C08f 1/98
U.S. Cl. 23—285   5 Claims

ABSTRACT OF THE DISCLOSURE

The apparatus for low pressure polymerization includes a closed circuit tubular reactor, a pump to circuate the dispersing medium for the polymerization or copolymerization and a support device for the reactor provided with means for permitting free movement in the plane of the reactor. By providing for free movement in the plane of the reactor, permanent deformations of the reactor assembly, due to heat stress are avoided.

BACKGROUND OF THE INVENTION

This invention relates to an apparatus for the polymerization and copolymerization of olefins. More particularly, the present invention concerns an improved apparatus for the continuous low pressure polymerization and copolymerization of olefins.

Polymerization and copolymerization of olefins are carried out in the presence of a variety of catalysts, including for example hexavalent chromium oxide deposited on a silica-aluminum support, molybdenum oxide supported on alumina and derivatives of transition metals i.e. metals of Groups IV-B—VI-B of the Periodic Table activated by an organometallic compound and the reaction product between a compound of a transition metal and a solid support such as a hydroxychloride of a divalent metal which has been activated with an organometallic compound.

In these catalytic processes, polymerization and copolymerization are almost always carried out in the presence of a liquid dispersing medium which is a solvent for the monomer(s).

As liquid dispersing medium, an inert hydrocarbon which is liquid under the operating polymerization conditions may be used. This is particularly true when these processes are applied to the polymerization of ethylene. The polymerization may also be carried out by using as diluent, monomers which are maintained in the liquid state under a pressure at least equal to their pressure of saturation. Elastomeric copolymers of ethylene and propylene and polymers of propylene may be produced in this way.

In each of the last mentioned two procedures, which are both important, the polymer is obtained in a particulate form thus constituting an independent solid phase. The presence of polymer granules in the reaction mixture creates various requirements which must be considered when devising the polymerization reactor.

It has in fact been noted that the polymer granules have a tendency to adhere to the walls of the reactor and to form agglomerates, especially in the dead zones of the reactor. Furthermore, if no specific provisions are taken when devising the reactor, crusts may be produced with the result that the reactor must be stopped often and cleaned. These disadvantages may be overcome if there is sufficient agitation inside the reactor and if the internal geometry of the reactor is such that there is no zone wherein the agitation is without effect.

However, even under conditions wherein excellent agitation is maintained, the reactor must be cleaned periodically. In order to remove material accumulated from polymerization reactions from the walls of the reactor efficiently, solvent washing at relatively high temperature is employed. Such cleaning produces pressure stresses which can cause substantial and permanent deformation to the apparatus.

In addition, if the utmost industrial conditions are desired, the reactor should be capable of being operated in a continuous manner.

SUMMARY OF THE INVENTION

It has been found that a reactor comprising a tube of constant cross-section and forming a closed circuit is particularly advantageous for carrying out polymerization and copolymerization of olefins in the presence of a catalyst. The diluent and the polymer granules in the suspension circulate at a speed of a few meters per second, which is sufficient to prevent the deposits from producing crusts. The circulation is assured by a pump, preferably of the axle type. There is no vapor phase inside the reactor.

Further, in accordance with the present invention, permanent deformation of the reactor assembly used for the polymerization and copolymerization of olefins, particularly deformation caused by heat stress, are avoided by the provision of means for free movement thereof along the plane of the reactor.

BRIEF DESCRIPTION OF THE DRAWINGS

In the drawings which illustrate an embodiment according to the invention.

DESCRIPTION OF THE PREFERRED EMBODIMENTS

Figure 1:
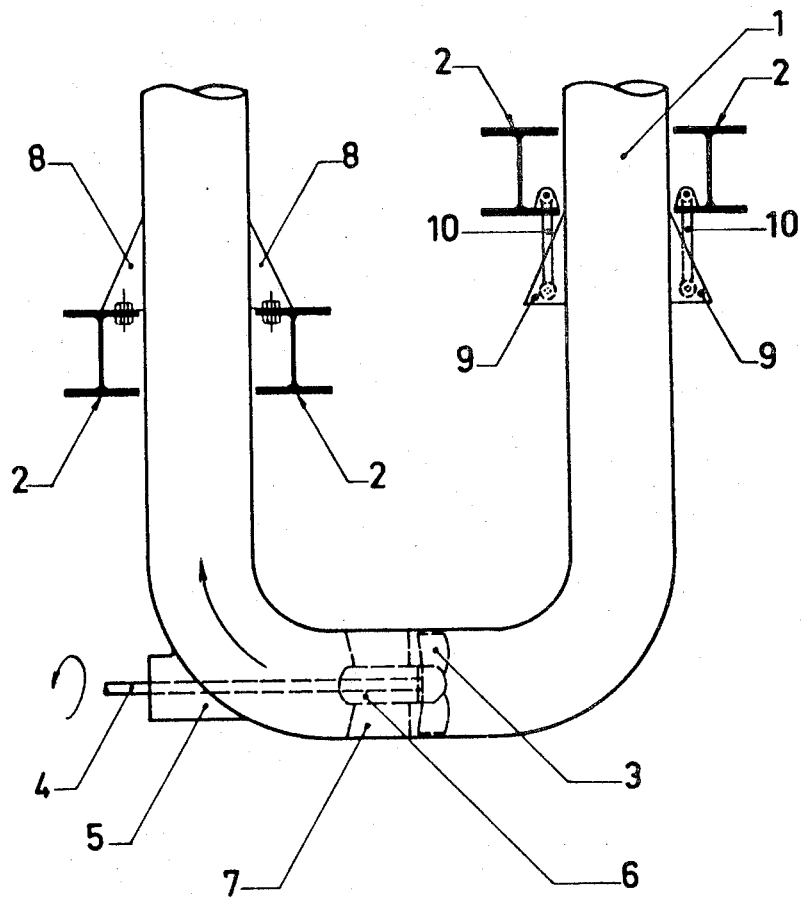
FIG. 1 is a schematic illustration of the device according to the invention.

The exterior shape of the reactor can vary to a great extent. The most simple shape is a rectangle in which the angles have been rounded off to reduce the loss of charge. It has been observed that the tendency of the polymer granules to pour off is much stronger in the portions of the reactor where the flow is horizontal. For this reason, the reactors are preferably mounted vertically and the vertical portions are much longer than the horizontal portions.

A form of reactor which provides a very high proportion of vertical portions without excessive height, is the double U. In this type of reactor, two U-shaped half buckles are arranged to face one another and are connected together at the top of the vertical legs of both U's.

The pump which produces the circulation of the dispersing medium inside the reactor is generally located at the base of the reactor, either in a horizontal portion thereof, or in the lower portion of a vertical branch. In most cases, the pump comprises one or more axle type wheels mounted in series on a common axle. The latter extends through the tubular wall of the reactor in the vicinity of an elbow and is preferably coupled through suitable elastic means to a motor mounted on the framework which supports the reactor. Stationary blades may be mounted upstream, downstream or between the wheels and serve to guide the fluid streams.

While the reactor is in use, the temperature of the walls seldom exceeds 150° C. However, during the maintenance periods, it may happen that the walls are heated to temperatures exceeding 200° C. while being washed. The linear dilations and radial movements resulting from these elevated temperatures may have important absolute values because of the substantial size of the reactors.

In practice, the reactors are embedded at the base thereof in the framework which supports the whole polymerization assembly. As a result, the upper portion of the reactor is freely expandable. The vertical branches are relatively larger than the horizontal branches, with the result that the expansion and movement thereof is more important. This, however, does not produce any stresses on the tubes since they are free to expand.

On the contrary, however, the reactor is not freely expandable in the horizontal embedded portion thereof and the elevation of temperature produce pressure stresses which are extremely dangerous for this type of structure. It should be pointed out that at the base, the horizontal portion may measure up to many meters. With respect to the tube which forms the reactor, it has a very small wall thickness compared to its diameter, which in some cases, may be over 50 cm.

Under these conditions, the pressure stresses produced when washing the reactor are sufficient to cause substantial permanent deformations to the assembly. For example, these deformations may include buckling of the tube, deformations of the stationary blades, distortions of the axes of the pump, damages to the impervious packing of the reactor caused by the extension of the pump axle through the walls of the reactor, etc. These deformations may cause serious damage to the asembly and may even require the complete shut off of the reactor, since the circulation pump then becomes inoperable.

Of course, these deformations may be prevented if the washing temperature of the reactor can be limited. However, polyethylene, which is the polyolefin most often produced in this type of reactor, is not sufficiently soluble in any type of solvent at room temperature. Therefore, elevated temperatures must be used in order to wash the reactor efficiently with a solvent in order to remove the accumulated material therefrom.

It has now been found that by permitting free expansion and movement along the plane of the reactor, it is possible to overcome and avoid permanent deformations in the reactor assembly, which operates in closed circuit and which is used for the polymerization or copolymerization of olefins, when the reactor is heated to a high temperature.

The object of the invention may be accomplished by providing a support for the reactor with means whereby the horizontal portion adjacent to the circulation pump, or which contains the pump, is freely dilatable and movable along the plane of the reactor.

In the specific case of a rectangular reactor which rests on its smaller side and contains the circulation pump in its lower horizontal portion this free expansion is effective, for example, when a vertical branch is embedded at its base while the lower horizontal branch rests on the framework which supports the assembly by means of a roller support.

In this particular case, another practical embodiment of the invention comprises embedding a vertical branch at the base thereof and suspending the other branch by means of connecting rods which are parallel to the plane of the reactor, and wherein one end of the rods is pivotally mounted to the reactor and the other end is pivotally mounted to the framework. Thus, the upper ends of these connecting rods may rotate about an axis which is perpendicular to the plane of the reactor and is part of the framework. The lower ends of the connecting rods rotate about an axis which is also perpendicular to the plane of the reactor and which is part of the reactor. These connecting rods are always parallel to one another.

According to the invention, the present apparatus may be used for the polymerization and copolymerization of olefins in the presence of all kinds of catalysts. In particular, well known processes in which the catalysts comprise hexavalent chromium oxide deposited on a silica-alumina supprt, molybdenum oxide supported on alumina, or the derivatives of transition metals such as titanium or vanadium which are activated by an organometallic compound may be carried out in the present apparatus. The application of the apparatus if this invention is especially indicated for the polymerization and copolymerization of olefins in the presence of a catalyst which has been obtained by activating with an organometalic compound, the reaction product between a halogenated compound of a transition metal and a solid support comprising a hydroxy chloride of a divalent metal as has been described for example in U.S. Pat. No. 3,400,100.

Referring to the drawings, particularly FIG. 1, the reactor 1 is generally rectangular and rests on the framework of the assembly by means of the beams 2. The lower horizontal branch contains the device which serves to circulate the diluent. This device is comprised of a pump of the axle type in which the wheel 3 is operated by the shaft 4. The shaft 4 extends through the impervious packing 5 and is supported by the bearing 6. The latter is fixedly mounted on the reactor by means of the stationary blades 7.

The vertical left branch is fixedly mounted on the framework by means of the two T-shaped double angle irons 8 which are welded to the reactor and are bolted on the beams 2.

The vertical right branch comprises two U-shaped double angle irons 9 which are also welded to the reactor. This branch is held by means of the connecting rods 10.

Figure 2:
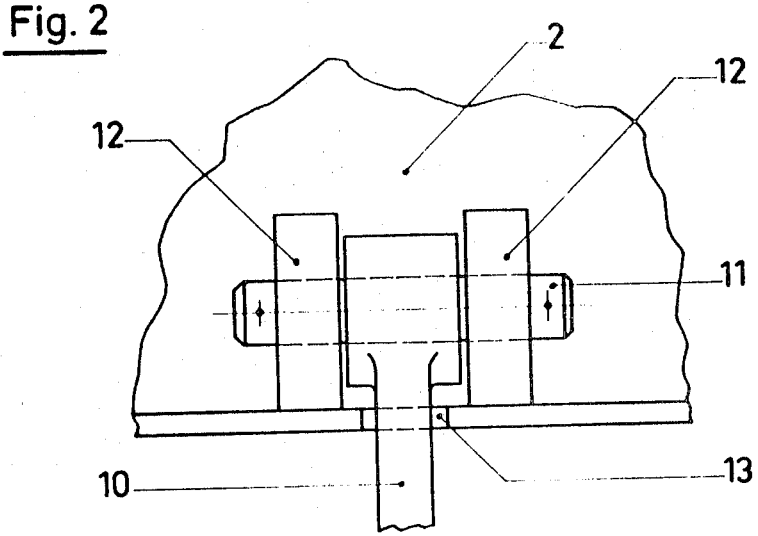
FIG. 2 is a detailed representation of the upper end of a connecting rod.

Referring to FIG. 2, which represents in detail the upper end of a connecting rod 10 there is a pin 11 extending through this portion of the rod. The pin 11 is supported by the stationary bearings 12 which are welded to the flange of the beam 2. The connecting rod 10 extends through the bore 13 of the flange of the beam.

Figure 3:
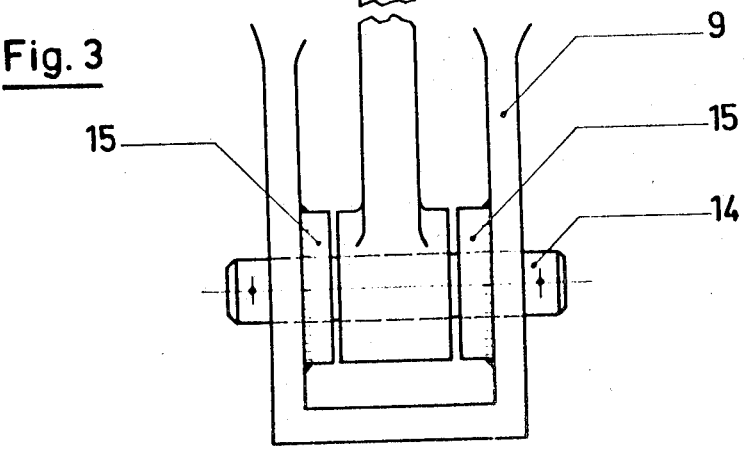
FIG. 3 is a detailed representation of the lower end of a connecting rod.

The details of the lower end of the connecting rod 10 is illustrated in FIG. 3. Pin 14 extends therethrough and is supported by the double angle iron 9 and its reinforcing means 15.

According to a modification of the device described above, the double bearing of the upper end of the connection rod may be replaced by a spherical support which forms a pivot such as a knee joint or a universal joint and allows the connecting rod to be articulated about a fixed point.

The specific double U-shape of the reactor is also important. It is obvious that the free expansion and movement of the horizontal branches of the reactor also serves to prevent permanent deformations resulting from a high temperature rise. Free expansion is made possible by following the same principles and utilizing the same means as in the case of the rectangular loop reactor.

However, in this case, it is not essential to permit free expansion of the horizontal branch of the reactor portion, in which there is no means to circulate the dispersing medium. During the washing periods, the tube forming the walls of the reactor may without detriment be submitted to substantial deformations since the latter would not damage the circulation pump, the driving shaft, the stationary blades, etc.

According to a particular embodiment of the invention, the holding means allowing for the free horizontal expansion and movement of the reactor may be combined with a device for absorbing the vibrations which are perpendicular to the plane of the reactor. This may be carried out by inserting the reactor between two oscillating adjustable cylindrical sectors which are supported on the framework of the assembly.

Figure 4:
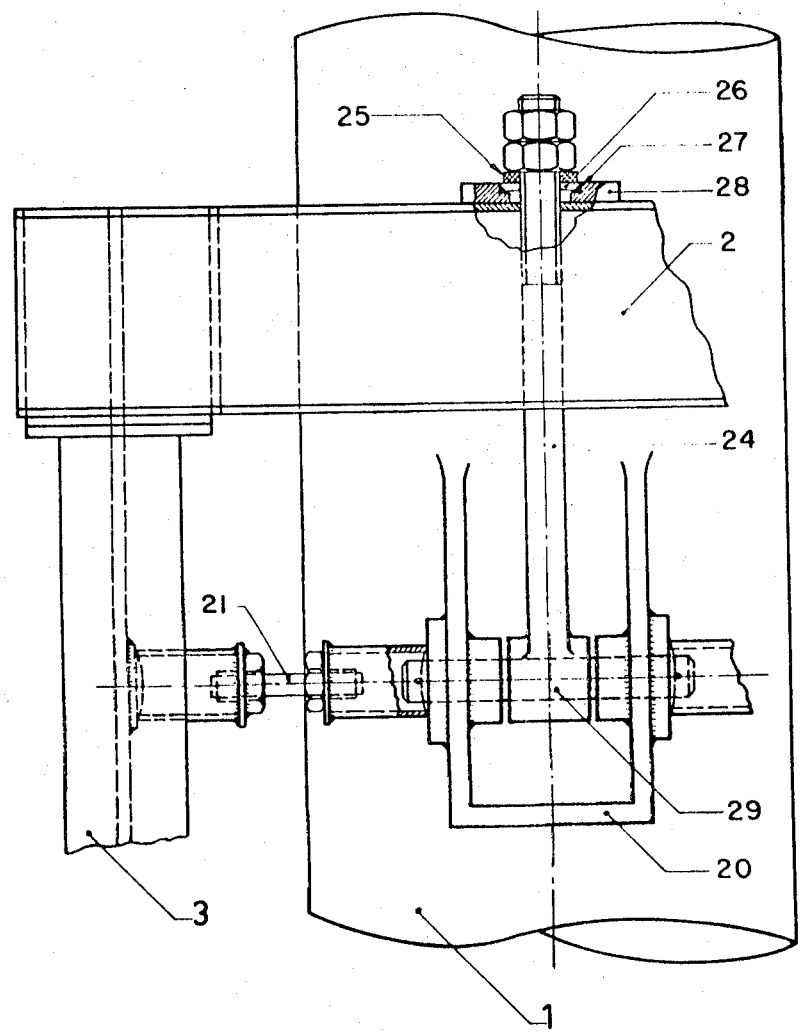
FIG. 4 is a representation along the axis of the tube, of a type of reactor suspension which is particularly adapted to assure free movement and expansion of the reactor in a plane which is perpendicular to that of the drawings.

FIG. 4 represents a type of holding means of the reactor which suitably allows for the free expansion and movement in a plane perpendicular to that of the drawing and passing through the axle of the tube.

The device illustrated in FIG. 4 which is partially represented in FIG. 1, is used to hold a vertical branch of a cylindrical tubular reactor at a point near its base, and an axial portion 1 has been represented in the drawings. The frame which supports the assembly is represented by the horizontal I beam 2 and by the vertical I beam 3.

The cylindrical connecting rod 24 is threaded at the upper end thereof and is provided with two nuts which transfer the force supported by the connecting rod, respectively to a washer 25, to a support ring 26 which is machined in the form of a sphere at the lower portion thereof, to the spherical seat 27 adjusted on to the support ring 26, to the washer 28 and finally to the upper flange of the beam 2. The lower end of the connecting rod 24 serves as a bearing for the pin 29. The latter also pivots in two bearings solid with the double angle iron 20. The latter, of triangular profile and U-shaped cross-section, is welded to the axle tube 1 that constitutes the reactor. In normal position, the connecting rod 24 is vertical.

The joint shown in FIG. 2 can be replaced by the joint shown in the upper part of FIG. 4 if desired.

FIG. 4 also illustrates the device 21 which limits the transversal vibrations. This device is supported on the double angle iron 20 and on the web of the vertical beam 3. The supporting surfaces are portions of a vertical cylinder. The device 21 is hollow and can vary in length.

Finally, the suspension comprises another connecting rod similar to connecting rod 24 which is located behind the axle tube 1.

Figure 5:
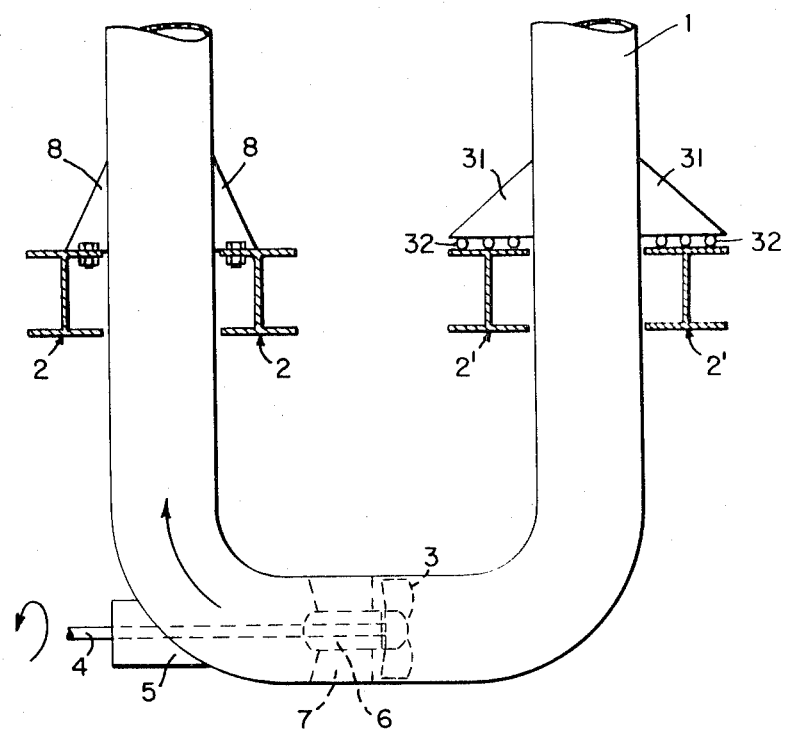
FIG. 5 is a schematic illustration similar to FIG. 1 but showing a modification.

In FIG. 5 there is shown a reactor which is similar to that shown in FIG. 1 except that the vertical right branch of the reactor is movably supported in a different manner. Angle brackets 31 which are welded on opposite sides of the right branch of the reactor 1 have horizontal lower faces which are supported by rollers 32 on the upper horizontal faces of beams 2'. It will be seen that the roller support provides for lateral movement of the vertical right branch of the reactor.

What I claim and desire to secure by Letters Patent is:

1. Apparatus for the low pressure polymerization and copolymerization of olefins, comprising a closed circuit tubular reactor including at least two horizontally spaced vertically extending tubular portions and connecting horizontal tubular portions forming a closed loop, impeller means in or adjacent to a said horizontal portion for recirculating a dispersing medium of polymerization and copolymerization in said loop and means supporting said reactor including first supporting means stationarily supporting a first said vertically extending portion at one side of said loop and second supporting means supporting a second said vertically extending portion at the opposite side of said loop for movement in the plane of said first and second vertically extending portions of said reactor, whereby permanent deformation of the reactor due to heat stress is avoided, said second supporting means comprising a fixed support and suspension rods arranged in parallel relationship and each pivotally connected at one end thereof to said fixed support and at the other end thereof to said second vertically extending portion of said reactor, the pivotal connections including a fixed pivot pin mounted on said fixed support and a movable pin connected to said second vertically extending portion of the reactor, the axes of said pins being perpendicular to said plane of said first and second vertically extending portions.

2. Apparatus according to claim 1, in which said impeller means comprises an impeller located in a horizontal portion of said loop connecting the lower ends of said first and second vertically extending portions and driven by a shaft coaxial with said horizontal portion.

3. Apparatus for the low pressure polymerization and copolymerization of olefins, comprising a closed circuit tubular reactor including at least two horizontally spaced vertically extending tubular portions and connecting horizontal tubular portions forming a closed loop, impeller means in or adjacent to a said horizontal portion for recirculating a dispersing medium of polymerization and copolymerization in said loop and means supporting said reactor including first supporting means stationarily supporting a first said vertically extending portion at one side of said loop and second supporting means supporting a second said vertically extending portion at the opposite side of said loop for movement in the plane of said first and second vertically extending portions of said reactor, whereby permanent deformation of the reactor due to heat stress is avoided, said second supporting means comprising a fixed support, a pin connected to said second vertically extending portion of said reactor, a spherical seat on said fixed support and a suspension rod articulated at one end about said pin and having at the other end a bearing portion bearing on said spherical seat.

4. Apparatus according to claim 3, further comprising means for absorbing vibrations of the reactor in a direction transverse to said plane of said first and second vertically extending portions, said vibration absorbing means being associated with said second supporting means.

5. Apparatus according to claim 4, in which said vibration absorbing means comprises a pair of adjustable oscillating cylindrical members which rest on said fixed support.

References Cited

UNITED STATES PATENTS

| | | | |
|---|---|---|---|
| 782,334 | 2/1905 | Gunn et al. | 165—162 |
| 2,016,787 | 10/1935 | Liessenberg | 122—510 |
| 3,226,205 | 12/1965 | Rohlfing | 23—288 |
| 2,459,720 | 1/1949 | Poltorak | 285—363 X |
| 2,533,868 | 12/1950 | Anderson | 285—363 X |
| 2,646,997 | 7/1953 | Magos et al. | 285—363 X |
| 2,684,255 | 7/1954 | Abele et al. | 285—363 X |
| 2,712,426 | 7/1955 | Banks | 23—284 X |

JAMES H. TAYMAN, JR., Primary Examiner

U.S. Cl. X.R.

23—252, 284; 260—88.2 B; 122—510; 165—122; 248—49, 128